United States Patent [19]

Kataoka et al.

[11] Patent Number: 4,565,673

[45] Date of Patent: Jan. 21, 1986

[54] PROCESS FOR ELUTING INDIUM FROM A CHELATE RESIN CONTAINING ADSORBED INDIUM

[75] Inventors: Yushin Kataoka; Masaaki Matsuda; Masahiro Aoi; Kunitake Chino, all of Niihama, Japan

[73] Assignee: Sumitomo Chemical Company, Limited, Osaka, Japan

[21] Appl. No.: 686,937

[22] Filed: Dec. 27, 1984

[30] Foreign Application Priority Data

Jan. 5, 1984 [JP] Japan .................................. 59-391

[51] Int. Cl.$^4$ ............................................. C01G 15/00
[52] U.S. Cl. ................................ 423/112; 75/101 BE; 423/DIG. 14; 423/139; 423/100; 423/89; 423/24
[58] Field of Search ..................... 423/112, DIG. 14; 75/101 BE

[56] References Cited

FOREIGN PATENT DOCUMENTS 3235693  4/1983  Fed. Rep. of Germany ...... 423/112
135128   8/1983  Japan ................................ 423/112

OTHER PUBLICATIONS

Riley et al., "Anal. Chim. Acta", vol. 40, 1968, pp. 479–485.

Strelow et al., "Talenta", vol. 21, Nov. 1974, pp. 1183–1191.

Primary Examiner—Herbert T. Carter
Attorney, Agent, or Firm—Stevens, DAvis, Miller & Mosher

[57] ABSTRACT

A process for eluting indium from a chelate resin having a phosphorus atom-containing, chelate-forming group which contains adsorbed indium, which comprises contacting said resin firstly with a primary eluent containing an acid containing no halogen atom in the molecule at a concentration of 0.1N or higher and then with an eluent for indium which is selected from the group consisting of (1) a solution of an acid containing a halogen atom in the molecule, (2) a mixed solution of (a) a metal halide, an ammonium halide or a mixture thereof and (b) an acid and (3) a mixed solution of a sulfide and a base compound.

13 Claims, No Drawings

PROCESS FOR ELUTING INDIUM FROM A CHELATE RESIN CONTAINING ADSORBED INDIUM

BACKGROUND OF THE INVENTION

1. Field of the Invention

This invention relates to a process for eluting indium from a chelate resin adsorbing indium. More particularly, the invention relates to a process for selective elution of indium which comprises firstly eluting cationic metals other than indium preferentially from a chelate resin having a phosphorus atom-containing, chelate-forming group which contains said metals including indium adsorbed and then eluting indium.

2. Description of the Prior Art

As a process for recovering indium from an indium-containing solution obtained by subjecting a sludge as a by-product in refining of zinc, lead or the like to a treatment such as leaching by sulfuric acid, there has hitherto been known a process for recovering indium by allowing a chelate resin having a functional group of iminodiacetic acid type to adsorb the indium in the solution [Anal. Chem. Acta., 40 (1968) 479-485]. However, because such a chelate resin has low adsorptivity for indium, the recovery amount of indium per unit amount of chelate resin used is low. For improvement of this problem, the present inventors had previously proposed a process for recovering indium by the use of a chelate resin having a phosphorus atom-containing, chelate-forming group [Japanese Patent Application Kokai (Laid-open) No. 172256/1983]. This chelate resin has much higher adsorptivity for indium. However, the resin, similarly to other known chelate resins, simultaneously adsorbs other metals such as, for example, iron, zinc, nickel, cobalt, copper and the like together with indium; accordingly, when an indium-containing solution wherein these other metals are also present is subjected to adsorption by the resin, the other metals are also adsorbed; and, in elution of indium from the resin by the use of an eluent, the other metals are eluted together with indium.

Because of the above problem, in recovery of indium from an indium-containing eluate obtained as above, a very complicated refining process has been required such as (1) a process wherein said eluate is neutralized to precipitate indium and other metal ions in the form of hydroxide and the hydroxides are dissolved in an acid or an alkali and this step is repeated to gradually increase the concentration of indium and (2) a process wherein said eluate is subjected to extraction by an indium-extracting agent and then the resulting extract is subjected to back extraction by a back extracting agent.

In view of the above situation, the present inventors have made extensive study on a process for selectively eluting and separating indium from a chelate resin containing adsorbed indium which is obtained by contacting an indium-containing solution with a particular chelate resin having a phosphorus atom-containing, chelate-forming group, of high adsorptivity for indium. As a result, it has been found that indium can easily be isolated from said chelate resin containing adsorbed indium by a two step treatment which comprises firstly contacting the chelate resin with a particular primary eluent capable of preferentially eluting metals other than indium and then contacting the resulting resin with an eluent for indium capable of eluting indium. Based on this finding, the present invention has been completed.

SUMMARY OF THE INVENTION

The object of the present invention is to provide a process for eluting indium from a chelate resin having a phosphorus atom-containing, chelate-forming group which adsorbed indium, which comprises contacting said resin firstly with a primary eluent containing an acid containing no halogen atom in the molecule at concentration of 0.1N or higher and then with an eluent for indium which is selected form the group consisting of (1) a solution of an acid containing a halogen atom in the molecule, (2) a mixed solution of (a) a metal halide, an ammonium halide or a mixture thereof and (b) an acid and (3) a mixed solution of a sulfide and a base compound.

DETAILED DESCRIPTION OF THE INVENTION

The chelate resin having a phosphorus atom-containing, chelate-forming group used in the present invention has no particular limitation as long as the resin has a phosphorus atom-containing, chelate-forming group. As the chelate-forming group, there can be mentioned, for example, a phosphine group, a phosphonium base, a phosphonic acid ester group, a phosphonic acid group, a phosphinic acid ester group, a phosphinic acid group, an aminoalkylenephosphonic acid ester group, an aminoalkylenephosphonic acid group and the metal salts of these chelate-forming groups. A chelate resin wherein one of these chelate-forming groups is combined with the main body of the resin via an aminoalkylene group is particularly preferable in the present invention because such a resin has high adsorptivity for indium and is excellent in selective elution of indium.

The above mentioned metal salts of phosphorus atom-containing, chelate-forming groups are metal salts formed by chelate or complex bonding between a phosphorus atom-containing, chelate-forming group and a metal. This metal has no particular restriction as long as it has a weaker bond with the chelate-forming group than indium has. As the metal, there can ordinarily be used alkali metals and alkaline earth metals such as sodium, potassium, calcium, magnesium and the like.

As the chelate resin having a phosphorus atom-containing, chelate-forming group, there can be mentioned, for example, chelate resins containing a phosphine group or a phosphomnium base which are obtained by reacting a polymer such as a styrene-divinylbenzene copolymer, a phenol resin, a polyethylene, a polypropylene or the like containing a halogenated alkyl group (a chloromethyl group, a bromomethyl group or the like) or an halogen atom (bromine, iodine or the like) with a phosphide compound or a phosphine compound such as lithium diphenylphosphide, sodium diphenylphosphide, lithium phenylphosphide, tricresylphosphine or the like or with a mixture of these compounds; chelate resins containing a phosphonic acid ester group obtained by reacting a styrene-divinylbenzene copolymer, a phenol resin, an aniline resin or a m-phenylene polymer (hereunder these are referred to as a resin containing a halogenated alkyl group) with a phosphorous acid derivative such as triethyl phosphite, triphenyl phosphite, trimethyl phosphite or the like or with a mixture of these phosphites (hereunder these phosphites and their mixtures are referred to as a phosphorous acid derivative); chelate resins containing a phosphonic acid group obtained by hydrolyzing said chelate resin containing a phosphonic acid ester group or by reacting a polymer such as a polystyrene, a phenol resin, a polyethylene, a polypropylene or the like with phosphorus trichloride and further with chlorine or oxygen and then hydrolyzing the reaction product; chelate resins containing a phosphonic acid ester group obtained by reacting said resin containing a halogenated alkyl group with a hypophosphorous acid derivative such as diethyl hypophosphite, diphenyl hypophosphite or the like or with a mixture of these hypophosphites (hereunder these hypophosphites and their mixtures are referred to as a hypophosphorous acid derivative); chelate resins containing a phosphinic acid group obtained by hydrolyzing said chelate resin containing a phosphinic acid ester group or by reacting a polymer such as a polystyrene, a phenol resin, a polyethylene, a polypropylene or the like with phosphorus trichloride and then hydrolyzing the reaction product; chelate resins containing an aminoalkylenephosphonic acid ester group or an aminoalkylenephosphinic acid ester group obtained by (1) contacting a polymer such as a styrene-divinylbenzene copolymer, a phenol resin, a polyethylene, a polypropylene, a polyvinyl chloride, a polyacralonitrile, a polyvinylidene cyanide, a polymethacrylonitrile, a poly-α-chloroacrylonitrile or the like containing a "reactive to amine" group such as a halogenated alkyl group, a sulfonyl chloride group, a carbonyl chloride group, an isocyanate group, a nitrile group, a chlorine atom, a bromine atom, an iodine atom, an epoxy group, an aldehyde group, a ketone group or the like (hereunder, these polymers are referred to as a resin containing a "reactive to amine" group) with an amine compound such as ammonia, ethylenediamine, diethylenetriamine, triethylenetetramine, tetraethylenepentamine, pentaethylenehexamine, hexamethylenediamine, guanidine, hydrazine or the like, reacting the resulting aminated resin with an aldehyde (e.g. acetaldehyde, formaldehyde or the like), a ketone (e.g. acetone, acetylacetone or the like) or a mixture thereof to obtain a resin containing a Schiff base and then reacting the resin with said phosphorous acid derivative, or by (2) reacting said aminated resin with an methylating agent (e.g. formalin, formaldehyde, paraformaldehyde, trioxane or the like) and said phosphorous acid derivative, or by (3) reacting said aminated resin with an halogenated alkylphosphonic acid ester (e.g. diethyl chloromethylphosphonate, ethyl chloromethylphosphonate, diethyl chloromethylphosphonate, dicresyl chloromethylphosphonate or the like), a halogenated alkylphosphinic acid ester (e.g. ethyl chloromethylphosphinate or the like) or their mixture; chelate resins containing an aminoalkylenephosphonic acid group or an aminoalkylenephosphinic acid group obtained by hydrolyzing said chelate resin containing an aminoalkylenephosphonic acid ester group or an aminoalkylenephosphinic acid ester group or by using phosphorous acid in place of a phosphorous acid derivative in the production of said chelate resin containing an aminoalkylenephosphonic acid ester or an aminoalkylenephosphinic acid ester group; and so forth.

The chelate resin containing adsorbed indium used in the present invention is a chelate resin containing indium and other metals adsorbed which is obtained by subjecting an indium solution containing indium and other metals (e.g. a solution obtained by subjecting a sludge as a by-product of metal refining to leaching by sulfuric acid or the like) to adsorption treatment by the use of the previously mentioned chelate resin having a phosphorus atom-containing, chelate-forming group. In some cases, the chelate resin containing adsorbed indium is washed as necessary, prior to the practice of the present invention process.

In the present invention, such a chelate resin containing adsorbed indium is contacted firstly with a primary eluent to preferentially elute metals other than indium without substantially eluting indium and then with an eluent for indium to elute indium.

As the primary eluent, there are used aqueous solutions containing an acid containing no halogen atom in the molecule such as an inorganic acid (e.g. sulfuric acid, nitric acid, phosphoric acid, boric acid or the like), an organic acid (e.g. acetic acid, formic acid, oxalic acid, lactic acid or the like) or a mixture of these acids. Particularly preferable aqueous solutions are those containing sulfuric acid, phosphoric acid, nitric acid, acetic acid or a mixture thereof.

The acid concentration in the primary eluent has no particular restriction as long as it is at or higher than a minimum concentration at which metals other than indium are preferentially eluted. Ordinarily, it is 0.1N or higher, preferably 0.3 to 5N.

The primary eluent is used, as a rule, in the form of an aqueous solution of the above mentioned acid. It may contain an organic solvent capable of dissolving the acid.

The amount of the primary eluent used is not particularly restricted and can vary depending upon the type and concentration of the acid in the primary eluent, the type of chelate resin, the type and amount of other metals than indium adsorbed by the chelate resin, etc. The amount of the primary eluent used can be determined by conducting a preliminary test as necessary.

The contact temperature between the chelate resin containing adsorbed metals and the primary eluent is not particulary restricted; however, the temperature is usually 0° to 100° C. The contact time between them is not particularly restricted, either.

The chelate resin from which metals other than indium have preferentially been eluted and removed by the primary eluent is contacted with an eluent for indium as it is or after water washing as necessary, whereby indium is eluted.

As the eluent for indium, there are used (1) a solution of an acid containing a halogen atom in the molecule, (2) a mixed solution of (a) a metal halide, an ammonium halide or their mixture and (b) an acid and (3) a mixed solution of a sulfide and a base compound.

As the acid containing a halogen atom in the molecule, there can be mentioned inorganic acids containing a halogen atom in the molecule, such as hydrochloric acid, hydrobromic acid, hydorfluoric acid, hydroiodic acid and their mixtures. These acids are ordinarily used in the form of an aqueous solution containing one of the acids or in the form of an mixed aqueous solution containing one of these acids and one of the previously mentioned acids containing no halogen atom in the molecule.

As the metal halide, there are preferably used halides of alkali metals and alkaline earth metals, such as sodium chloride, sodium bromide, sodium fluoride, potassium chloride, potassium bromide, potassium fluoride, magnesium chloride, magnesium bromide, calcium chloride, calcium bromide and the like.

As the ammonium halide, there are mentioned, for example, ammonium chloride, ammonium bromide and the like. Ammonium chloride is particularly preferable.

The metal halide, the ammonium halide or their mixture is mixed with an acid and the resulting mixture is used as an aqueous solution.

The acid used above may or may not contain a halogen atom in the molecule and may be a mixture. Various acids such as mentioned above can be used.

As the sulfide, there can be mentioned water-soluble inorganic sulfides such as sodium sulfide, sodium hydrosulfide, ammonium sulfide, hydrogen sulfide, potassium sulfide, ammonium hydrogensulfide, sodium hydrogensulfide, lithium sulfide, barium sulfide, magnesium sulfide and the like. As the base compound, there can be mentioned inorganic alkali compounds such as sodium hydroxide, potassium hydroxide, calcium hydroxide, magnesium hydroxide, ammonia and the like as well as water-soluble organic amines such as ethylenediamine, diethylenetriamine, diethylamine, triethylamine and the like. The sulfide and the base compound are mixed and the resulting mixture is used as an aqueous solution.

These eluents for indium are, as previously described, used in the form of aqueous solution. They may also contain an organic solvent unless the solvent badly affect the elution treatment.

Of the above mentioned eluents for indium, in the present invention, there are particularly preferred an aqueous solution of hydrochloric acid, an aqueous solution of a mixture between (a) sulfuric acid, nitric acid or acetic acid and (b) sodium chloride, ammonium chloride, calcium chloride or magnesium chloride and an aqueous solution of a mixture between (a) sodium sulfide, sodium hydrosulfide, ammonium sulfide or hydrogen sulfide and (b) sodium hydroxide, potassium hydroxide, calcium hydroxide or ammonia.

In the present invention, there is used an eluent for indium selected from three kinds of the eluents (1), (2) and (3) mentioned above. The concentration of the active component in the eluent for indium is not particularly restricted as long as the concentration is at a minimum level at which indium can be eluted. In general, it is preferable that the concentration of the active component in the eluent for indium be 0.3N or higher.

The amount of the eluent for indium used has no particular restriction. It can vary depending upon the type and concentration of the active component in eluent, the type of the chelate resin, the amount of indium adsorbed by the resin, etc. and can be determined by conducting a preliminary test as necessary.

The temperature of the contact between the chelate resin containing adsorbed indium and the eluent for indium is not particularly restricted. It is however, usually 0° to 100° C.

The time of the contact between them is not particularly restricted, either.

As mentioned above, in the present invention, the chelate resin containing adsorbed indium is contacted firstly with the primary eluent and then with the eluent for indium. Contact methods used in these contacts are not particularly restricted. As the contact methods, there are used ordinary contact methods such as, for example, (1) a method wherein an eluent is passed through a column packed with a chelate resin containing adsorbed indium, (2) a method wherein a chelate resin containing adsorbed indium is immersed in an eluent and (3) a method which is a combination of (1) and (2). The method (1), namely, a packed column method is preferable in view of treatment procedure, efficiency, etc.

Thus according to the present invention, indium of a high purity can be eluted by the eluent effectively by a simple procedure.

The eluate obtained is subjected to recovery of metallic indium by a method such as electrolysis, as it is, or after it has been contacted once more with a chelate resin having a phosphorus atom-containing, chelate-forming group for refining such as adsorption, elution and the like, or after it has been neutralized to obtain sponge indium and then the sponge indium has been dissolved in sulfuric acid.

Hereunder, the present invention will be explained in more detail by way of Examples; however, the invention is in no way restricted to these Examples.

EXAMPLE 1

A solution obtained by subjecting a pig iron dust to leaching by sulfuric acid was contacted with a chelate resin having an aminomethylenephosphonic acid group (DUOLITE ES-467, manufactured by Diamond Shamrock Corp.) (hereunder this resin is referred to as chelate resin A) to obtain a chelate resin containing 2.2 g of indium, 1,494 g of zinc, 43 g of iron and 105 g of cadmium adsorbed per 1 kg of the resin. The resin was packed in a column. At the top of the column, a 2N aqueous sulfuric acid solution as a primary eluent was charged into the column at room temperature at a space velocity of 2 hr$^{-1}$ in a total volume of 20 times the volume of the resin, whereby 0.01 g indium, 1,494 g of zinc, 43 g of iron and 105 g of cadmium were eluted. Subsequently, a 4N aqueous hydrochloric acid solution as an eluent for indium was charged at room temperature at a space velocity of 1 hr$^{-1}$ in a total volume of 5 times the volume of the resin, whereby 2.1 g of indium could be eluted by the hydrochloric acid solution.

EXAMPLES 2 TO 11

Elution was conducted in the same manner as in Example 1 except that the types and concentrations of the primary eluent and the eluent for indium each used in Example 1 were changed. The results obtained are shown in Table 1.

TABLE 1

| | Primary elution | | | | | Elution of indium | | | | |
|---|---|---|---|---|---|---|---|---|---|---|
| | Type and concentration | Amount of metal eluted (g) | | | | Type and concentration | Amount of metal eluted (g) | | | |
| Example | of eluent | In | Fe | Zn | Cd | of eluent | In | Fe | Zn | Cd |
| 2 | 4 N Aqueous phosphoric acid solution | 0.0 | 43.0 | 1492 | 105 | Aqueous solution containing 2 N sulfuric acid and 1 mole/l of sodium chloride | 2.0 | 0.0 | 0.3 | 0.0 |
| 3 | 1 N Aqueous nitric acid solution | 0.1 | 42.7 | 1493 | 104 | Aqueous solution containing 1 N hydrochloric acid and 1 mole/l of ammonium chloride | 2.1 | 0.3 | 0.2 | 0.1 |
| 4 | 2 N Aqueous acetic acid | 0.0 | 43.0 | 1492 | 104 | Aqueous solution containing 0.5 N hydrofluoric acid and | 1.9 | 0.0 | 0.3 | 0.2 |

TABLE 1-continued

| | Primary elution | | | | | Elution of indium | | | | |
|---|---|---|---|---|---|---|---|---|---|---|
| Example | Type and concentration of eluent | Amount of metal eluted (g) | | | | Type and concentration of eluent | Amount of metal eluted (g) | | | |
| | | In | Fe | Zn | Cd | | In | Fe | Zn | Cd |
| 5 | 3 N Aqueous sulfuric acid solution | 0.0 | 43.0 | 1494 | 105 | 2 N potassium fluoride Aqueous solution containing 2 N nitric acid and 2 moles/l of calcium chloride | 2.0 | 0.0 | 0.0 | 0.0 |
| 6 | 2 N Aqueous sulfuric acid solution | 0.0 | 42.7 | 1494 | 105 | Aqueous solution containing 2 N phosphoric acid and 2 moles/l of calcium chloride | 2.1 | 0.3 | 0.0 | 0.0 |
| 7 | 2 N Aqueous sulfuric acid solution | 0.0 | 43.0 | 1494 | 105 | Aqueous solution containing 1 N hydrogen bromide and 1 N magnesium chloride | 2.2 | 0.0 | 0.0 | 0.0 |
| 8 | 2 N Aqueous sulfuric acid solution | 0.0 | 43.0 | 1494 | 104 | Aqueous solution containing 1 N hydrogen iodide and 2 N sodium fluoride | 2.0 | 0.0 | 0.0 | 0.1 |
| 9 | 2 N Aqueous oxalic acid solution | 0.0 | 42.2 | 1493 | 103 | Aqueous solution containing 2 N hydrochloric acid and 2 moles/l of sodium chloride | 2.2 | 0.7 | 0.2 | 0.3 |
| 10 | 2 N Aqueous boric acid solution | 0.0 | 42.3 | 1492 | 103 | Aqueous solution containing 2 N sodium hydroxide and 2 moles/l of sodium sulfide | 1.9 | 0.6 | 0.3 | 0.2 |
| 11 | 2 N Aqueous formic acid solution | 0.0 | 42.1 | 1492 | 103 | Aqueous solution containing 2 N potassium hydroxide and 2 moles/l of sodium hydrosulfide | 1.8 | 0.7 | 0.3 | 0.3 |

EXAMPLES 12 TO 19 AND COMPARATIVE EXAMPLE 1

A solution containing indium and other metals which had been obtained by subjecting a lead slag as a by-product of cadmium refining to leaching by sulfuric acid was contacted with the following chelate resins B to J and a chelate resin having an iminodiacetic acid group (DUOLITE ES-466, manufactured by Diamond Shamrock Corp.). The respective resins adsorbed metals as shown in Table 2.

These resins containing adsorbed metals were then subjected to two stage elution by the use of a primary eluent and an eluent for indium as shown in Table 2, in the same manner as in Example 1. The results obtained are shown in Table 2.

Chelate resin B: A commercially available resin having a phosphonic acid group (DUOLITE ES-63, manufactured by Diamond Shamrock Corp.).

Chelate resin C: A resin having an aminoalkylenephosphonic acid ester group which was obtained by reacting 60 parts by weight of a polyacrylonitrile with 103 parts by weight of diethylenetriamine in a water medium to obtain an aminated polyacrylonitrile and then reacting the aminated polyacrylonitrile with 281 parts by weight of an aqueous formalin solution and 498 parts by weight of triethyl phosphite in the presence of 36% hydrochloric acid.

Chelate resin D: A resin having a quaternary phosphonium base which was obtained by reacting 200 parts by weight of a chloromethylated polystyrene with 200 parts by weight of tributylphosphine in dimethylformamide.

Chelate resin E: A resin having a phosphine group which was obtained by reacting 150 parts by weight of a brominated polystyrene with 64 parts by weight of a hexane solution containing 1.6 mol % of n-butyllithium in tetrahydrofuran as a solvent to obtain a lithium polystyrene, reacting the lithium polystyrene with 300 parts by weight of chlorodiphenylphosphine in tetrahydrofuran and oxidizing the reaction product with 371 parts by weight of 40% peracetic acid in methylene chloride as a solvent.

Chelate resin F: A resin having a sodium phosphonate group which was obtained by hydrolyzing the chelate resin D with a 20% aqueous sodium hydroxide solution.

Chelate resin G: A resin having a phosphinic acid group which was obtained by reacting 100 parts by weight of a polystyrene with 150 parts by weight of phosphorus trichloride in chloroform as a solvent and then hydrolyzing the reaction product.

Chelate resin H: A resin having a phosphinic acid ester group which was obtained by reacting 100 parts by weight of an aminated polystyrene with 120 parts by weight of cresyl chloromethylphosphinate in 1,2-dichloroethane as a solvent.

Chelate resin I: A resin having a diethylenetriaminomethylenephosphonic acid group which was obtained by hydrolyzing the chelate resin C with a 20% aqueous sodium hydroxide solution.

Chelate resin J: A resin having an aminoalkylenephosphonic acid group which was obtained by using the same procedure as in production of the chelate resin C except that 498 parts by weight of triethyl phosphite used in production of the chelate resin C was replaced by 246 parts by weight of phosphorous acid.

TABLE 2

| | Type of resin | Amount of metal adsorbed (g/kg resin) | | | | Primary elution | | | | |
|---|---|---|---|---|---|---|---|---|---|---|
| | | | | | | Type and concentration of eluent | Amount of metal eluted (g) | | | |
| | | In | Cd | Zn | Pb | | In | Cd | Zn | Pb |
| Example 12 | Chelate | 1.8 | 413 | 875 | 0.8 | 1 N Aqueous sulfuric | 0.2 | 413 | 875 | 0.8 |

TABLE 2-continued

| | | | | | | Elution of indium | | | |
|---|---|---|---|---|---|---|---|---|---|
| | | | | | | Type and concentration of eluent | | | |
| Example 13 | Chelate resin B | 3.7 | 542 | 1391 | 1.1 | 1 N Aqueous sulfuric acid solution | 0.0 | 542 | 1390 | 1.1 |
| Example 14 | Chelate resin C | 2.4 | 403 | 1206 | 0.9 | 1 N Aqueous sulfuric acid solution | 0.3 | 403 | 1205 | 0.9 |
| Example 15 | Chelate resin E | 1.9 | 392 | 1103 | 0.7 | 1 N Aqueous sulfuric acid solution | 0.2 | 392 | 1101 | 0.7 |
| Example 16 | Chelate resin F | 1.8 | 371 | 985 | 0.9 | 0.5 N Aqueous sulfuric acid solution | 0.3 | 370 | 984 | 0.9 |
| Example 17 | Chelate resin G | 4.1 | 592 | 1447 | 1.1 | 2 N Aqueous sulfuric acid solution | 0.0 | 592 | 1445 | 1.1 |
| Example 18 | Chelate resin H | 4.7 | 692 | 1531 | 1.3 | 2 N Aqueous sulfuric acid solution | 0.0 | 692 | 1530 | 1.3 |
| Example 19 | Chelate resin I | 5.2 | 703 | 1471 | 1.2 | 50% Aqueous sulfuric acid solution | 0.0 | 703 | 1470 | 1.2 |
| Comparative Example 1 | DUOLITE ES-466 | 0.4 | 453 | 1430 | 1.9 | 1 N Aqueous sulfuric acid solution | 0.4 | 453 | 1430 | 1.9 |

| | | Elution of indium | | | | |
|---|---|---|---|---|---|---|
| | | Type and concentration of eluent | Amount of metal eluted (g) | | | |
| | | | In | Cd | Zn | Pb |
| | Example 12 | 2 N Aqueous hydrochloric acid solution | 1.6 | 0.0 | 0.0 | 0.0 |
| | Example 13 | 3 N Aqueous hydrochloric acid solution | 3.7 | 0.0 | 0.3 | 0.0 |
| | Example 14 | 2 N Aqueous hydrochloric acid solution | 2.1 | 0.0 | 0.2 | 0.0 |
| | Example 15 | Aqueous solution containing 0.5 N hydrochloric acid and 0.2 N hydrogen fluoride | 1.7 | 0.0 | 0.4 | 0.0 |
| | Example 16 | 1 N Aqueous hydrochloric acid solution | 1.5 | 0.4 | 0.3 | 0.0 |
| | Example 17 | 2 N Aqueous hydrochloric acid solution | 4.1 | 0.0 | 0.2 | 0.0 |
| | Example 18 | Aqueous solution containing 2 N hydrochloric acid and 2 moles/l sodium fluoride | 4.7 | 0.0 | 0.1 | 0.0 |
| | Example 19 | Aqueous solution containing 1 N sulfuric acid and 2 moles/l of ammonium chloride | 5.2 | 0.0 | 0.1 | 0.0 |
| | Comparative Example 1 | 2 N Aqueous hydrochloric acid solution | 0.0 | 0.0 | 0.0 | 0.0 |

What is claimed is:

1. A process for eluting indium from a chelate resin having a phosphorus atom-containing, chelate-forming group selected from the group consisting of a phosphine group, a phosphonium base, a phosphonic acid ester group, a phosphonic acid group, a phosphinic acid ester group, a phosphinic acid group, a aminoalkylenephosphonic acid ester group or an aminoalkylenephosphonic acid group, which contains adsorbed indium and at least one metal selected from the group consisting of iron, zinc, nickel, cobalt, copper, cadmium and lead, which comprises contacting said resin firstly with a primary eluent for the metals other than indium containing an acid containing no halogen atom in the molecule selected from the group consisting of sulfuric acid, nitric acid, phosphoric acid, acetic acid and a mixture thereof at a concentration of 0.1N or higher and then with an eluent for indium which is selected from the group consisting of (1) a solution of an acid containing a halogen atom in the molecule, (2) a mixed solution of (a) a metal halide, an ammonium halide or a mixture thereof and (b) an acid and (3) a mixed solution of a sulfide and a base compound.

2. A process according to claim 1, wherein the chelate resin having a phosphorus atom-containing, chelate-forming group is a chelate resin wherein a phosphorus atom-containing, chelate-forming group is bonded to the main body of the resin via an aminoalkylene group.

3. A process according to claim 1, wherein the solution of an acid containing a halogen atom in the molecule is an aqueous solution of said acid or a mixed aqueous solution of said acid and an acid containing no halogen atom in the molecule.

4. A process according to claim 3, wherein the acid containing no halogen atom in the molecule is sulfuric acid, nitric acid, phosphoric acid, acetic acid or a mixture thereof.

5. A process according to claim 1, wherein the acid containing a halogen atom in the molecule is hydrogen chloride, hydrogen bromide, hydrogen fluoride, hydrogen iodide or a mixture thereof.

6. A process according to claim 1, wherein the metal halide is an alkali metal halide, an alkaline earth metal halide or a mixture thereof.

7. A process according to claim 6, wherein the alkali metal halide is sodium chloride, potassium chloride, sodium fluoride or potassium fluoride.

8. A process according to claim 6, wherein the alkaline earth metal halide is calcium chloride or magnesium chloride.

9. A process according to claim 1, wherein the ammonium halide is ammonium chloride.

10. A process according to claim 1, wherein the eluent for indium is a mixed solution of a sulfide and a base compound.

11. A process according to claim 1, wherein the sulfide is sodium sulfide, sodium hydrosulfide, ammonium sulfide, hydrogen sulfide or a mixture thereof.

12. A process according to claim 1, wherein the base compound is a hydroxide of an alkali metal, a hydroxide of an alkaline earth metal or a mixture thereof.

13. A process according to claim 1, wherein the base compound is ammonia.

* * * * *